(12) United States Patent
Nauche et al.

(10) Patent No.: US 8,997,366 B2
(45) Date of Patent: Apr. 7, 2015

(54) TEMPLATE FOR CALIBRATING A MACHINE USED TO MACHINE AN OPHTHALMIC LENS, DEVICE AND METHOD USING SUCH A TEMPLATE

(75) Inventors: Michel Nauche, Charenton le Pont (FR); Laurent Geysels, Charenton le Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 190 days.

(21) Appl. No.: 13/877,344

(22) PCT Filed: Sep. 5, 2011

(86) PCT No.: PCT/FR2011/000489
§ 371 (c)(1),
(2), (4) Date: Apr. 2, 2013

(87) PCT Pub. No.: WO2012/049377
PCT Pub. Date: Apr. 19, 2012

(65) Prior Publication Data
US 2013/0190919 A1    Jul. 25, 2013

(30) Foreign Application Priority Data
Oct. 15, 2010 (FR) ..................... 10 04064

(51) Int. Cl.
G01B 3/14 (2006.01)
G01B 5/14 (2006.01)
B24B 9/14 (2006.01)
B24B 13/005 (2006.01)
B24B 47/22 (2006.01)
G05B 19/18 (2006.01)

(52) U.S. Cl.
CPC . *G01B 5/14* (2013.01); *B24B 9/146* (2013.01); *B24B 13/005* (2013.01); *B24B 47/225* (2013.01); *G05B 19/18* (2013.01)

(58) Field of Classification Search
CPC ........ B24B 47/225; B24B 9/146; B24B 9/144
USPC ................. 33/200, 502, 507, 562, 563, 679.1
See application file for complete search history.

(56) References Cited

U.S. PATENT DOCUMENTS 2,317,925 A * 4/1943 Lewis .............................. 33/507
3,501,842 A * 3/1970 Beasley .......................... 33/507
3,589,079 A * 6/1971 Beasley .......................... 33/507

(Continued)

FOREIGN PATENT DOCUMENTS

EP    0 744 246    11/1996

OTHER PUBLICATIONS

International Search Report dated Oct. 18, 2011, corresponding to PCT/FR2011/000489.

*Primary Examiner* — G. Bradley Bennett
(74) *Attorney, Agent, or Firm* — Young & Thompson

(57) ABSTRACT

A calibration template for calibrating a machining device that has blocking elements for blocking an ophthalmic lens, and machining elements for machining the ophthalmic lens, the template including a fastener portion suitable for being fastened to the blocking elements and a calibration portion arranged around the fastener portion. The calibration portion is made out of a material that is suitable for being machined by the machining elements, and presents firstly a plurality of shape patterns, and secondly a plurality of visual identifiers each visually associated with one of the shape patterns.

21 Claims, 5 Drawing Sheets

(56) References Cited

U.S. PATENT DOCUMENTS

| | | | |
|---|---|---|---|
| 4,573,121 A * | 2/1986 | Saigo et al. | 33/507 |
| 4,656,754 A | 4/1987 | Cingone | |
| 5,121,550 A * | 6/1992 | Wood et al. | 33/200 |
| 5,806,198 A | 9/1998 | Guillermin | |
| 6,071,176 A | 6/2000 | Kruis et al. | |
| 2003/0099521 A1* | 5/2003 | Feldman | 409/94 |
| 2005/0275802 A1* | 12/2005 | Nauche et al. | 351/177 |
| 2014/0329443 A1* | 11/2014 | Savoie | 451/390 |

\* cited by examiner

TEMPLATE FOR CALIBRATING A MACHINE USED TO MACHINE AN OPHTHALMIC LENS, DEVICE AND METHOD USING SUCH A TEMPLATE

TECHNICAL FIELD TO WHICH THE INVENTION RELATES

The present invention relates in general to calibrating devices for machining ophthalmic lenses, where such calibration needs to be performed regularly in order to have an accurate reference for each of its parameters.

More particularly, the invention relates to a calibration template for calibrating a machining device that has blocking means for blocking an ophthalmic lens, and machining means for machining the ophthalmic lens, the template comprising a fastener portion suitable for being fastened to said blocking means and a calibration portion arranged around said fastener portion.

The invention also relates to a machining device suitable for being calibrated with the help of such a calibration template.

The invention also provides a method of calibrating the position of a tool of the machining device with the help of a calibration template as specified above.

TECHNOLOGICAL BACKGROUND

Document EP 0 744 246 discloses a calibration template of the kind mentioned above, which template is for mounting in the place of an ophthalmic lens on a machining device that is fitted firstly with two arms for blocking an ophthalmic lens, and secondly with a grindwheel having a beveling groove.

That calibration template is in the general form of a disk with an edge face that presents a hollow setback that defines two angular points.

On calibration, when the calibration template is blocked between the two blocking arms of the machining device, use is made of those angular points to determine the radial position and the angular position of the axis of the blocking arms relative to the axis of the grindwheel.

On its circular portion, the edge face of the calibration template also presents a zone of bevel-shaped cross-section.

During calibration, use is made of this bevel to determine the axial position of the beveling groove of the grindwheel relative to the axis of the blocking arms.

Although such a calibration template is found to be perfectly effective in calibrating the position of the grindwheel relative to the blocking arms, it is nevertheless found to be unsuitable for calibrating the positions of other tools that the machining device may include. In particular, it is unsuitable for calibrating the positions of a drill, of a grooving grindwheel, or indeed of a chamfering grindwheel fitted to the machining device.

In order to perform such calibration, the user of the machining device is thus constrained to call on competent technicians.

In order to perform calibration, such technicians generally make use of about twenty ophthalmic lenses to perform tests that are lengthy, tedious, and difficult, and that make it possible, after trial and error, to calibrate the positions of the drill, the grooving grindwheel, and the chamfering grindwheel of the machining device.

OBJECT OF THE INVENTION

In order to remedy the above-mentioned drawbacks of the state of the art, the present invention proposes a novel calibration template making it possible to perform quickly and simply a method of calibrating the positions of all of the tools of the machining device.

More particularly, the invention proposes a calibration template as defined in the introduction, in which said calibration portion is made out of a material that is suitable for being machined by said machining means, and presents firstly a plurality of shape patterns, and secondly a plurality of visual identifiers, each visually associated with one of said shape patterns.

Thus, by means of the invention, the calibration template can be used not only by being put into contact with tools of the machining device, as already applies with the template described in document EP 0 744 246, but also by being machined with those tools.

In particular, the calibration template may be machined by a given tool using the same control setpoints in each of its shape patterns, with only the value of one parameter for calibration being varied from one machining operation to another. In that way, the calibration template then enables the user to compare the result of those various machining operations and to deduce therefrom which of the values is the most suitable for the parameter that is to be calibrated.

The visual identifier that is associated with the shape pattern where the best machining was performed then enables the value of the parameter to be calibrated to be input in practical manner into the computer control unit of the machining device.

Other characteristics of the calibration template in accordance with the invention and that are advantageous and non-limiting are as follows:
    said shape patterns are all of identical shape;
    said shape patterns are distributed at regular intervals over said calibration portion around said fastener portion;
    each shape pattern and each associated visual identifier extends around said fastener portion over a given angular sector of one face of said calibration portion;
    each shape pattern comprises a plurality of distinct centering marks;
    at least one of said centering marks includes a target;
    the target of one of said centering marks comprises a circular arc centered about said fastener portion, and the target of another of said centering marks comprises a mark that is radial relative to said fastener portion;
    said visual identifiers are constituted by distinct digits and/or letters;
    the calibration template is made as a single piece by molding and said visual identifiers and said shape patterns are formed in relief on said calibration portion;
    said calibration portion presents an edge face having a circular fraction about the fastener portion and at least one local setback that is set back relative to said circular fraction in order to define two angular points;
    said calibration portion presents an edge face that includes a circular fraction about the fastener portion, which edge face presents a cross-section that is of bevel shape;
    said calibration portion presents front and rear faces that are substantially plane and that include two projections, each projecting from a respective one of its front and rear faces, each of these two projections presenting a flat bottom that is substantially parallel to said front and rear faces, which flat bottoms are connected together by a connecting wall that is in part plane and slanting relative thereto; and
    said calibration portion presents front and rear faces and includes a peg projecting from each of its front and rear faces.

The invention also relates to a machining device suitable for being calibrated with the help of such a calibration template, and comprising blocking means for blocking an ophthalmic lens;

machining means for machining said ophthalmic lens, the machining means comprising at least one of the following tools: a drill, a grooving grindwheel, and a chamfering tool;

a control unit for controlling the positions of said machining means relative to said blocking means;

information display means controlled by said control unit; and input means accessible to the user to enable the user to input data and adapted to transmit said data to said control unit.

According to the invention, the machining device is such that:

said control unit is programmed to display the visual identifiers of the calibration template on said display means;

said input means enable one of the displayed identifiers to be selected; and said control unit is adapted to calibrate the position of said tool relative to said blocking means as a function of the selected identifier.

The invention also provides a method of calibrating the position of a tool of a machining device with the help of a calibration template as specified above, said tool presenting at least one freedom of movement controlled by the control unit of the machining device as a function of a control setpoint corrected by a calibration parameter, the method including the following steps:

a) fastening the fastener portion of the calibration template on the blocking means of the machining device;

b) machining the calibration portion of the calibration template by using the tool of the machining device on each of the shape patterns of the calibration template, in application of control setpoints that are similar but in which the calibration parameter is modified in each of the shape patterns;

c) a user visually selecting one of the machined shape patterns, namely the pattern where the machining that has been performed is considered as being the best;

d) the user reading the visual identifier associated with the selected shape pattern;

e) the user using the input means of the machining device to input the visual identifier that has been read; and f) allocating the value that was used for machining the selected shape pattern as the calibration parameter.

Other characteristics of the calibration method in accordance with the invention and that are advantageous and non-limiting are as follows:

said tool presents at least one second freedom of movement controlled by the control unit of the machining device as a function of a control setpoint corrected by a second calibration parameter, and steps b) to f) are repeated by machining the calibration portion of the calibration template in each of its shape patterns using control setpoints that are similar but in which the second calibration parameter is modified in each of the shape patterns;

said machining device includes another tool presenting at least one freedom of movement controlled by the control unit as a function of another control setpoint corrected by another calibration parameter, and steps b) to f) are repeated by machining the calibration portion of the calibration template in each of its shape patterns using control setpoints that are similar but in which said other calibration parameter is modified in each of the shape patterns;

there is provided a step g) of logging the value allocated to the calibration parameter, in which step the calibration template is machined in a position and/or with a shape that is characteristic of said allocated value;

in step g), the position and/or the shape of the machining is characteristic of the calibrated calibration parameter;

there is provided a step g') of finally checking the calibration template, in which step the edge face of the calibration template is machined with a predetermined shape, making it possible to check visually that the calibration parameter is appropriate; and in step g'), said predetermined shape forms at least one angle on the edge face of the calibration template that, providing the first calibration parameter is appropriate, is in alignment with a mark of the calibration template.

DETAILED DESCRIPTION OF AN EMBODIMENT

The following description with reference to the accompanying drawings that are given by way of non-limiting example shows what the invention consists in and how it can be reduced to practice.

MACHINE DEVICE

In order to machine an ophthalmic lens 100, it is possible to make use of a machining device implemented in the form of any machine for cutting or removing material so as to modify the outline of the ophthalmic lens in order to match its shape to the shape of the surround of an eyeglass frame.

Figure 1:
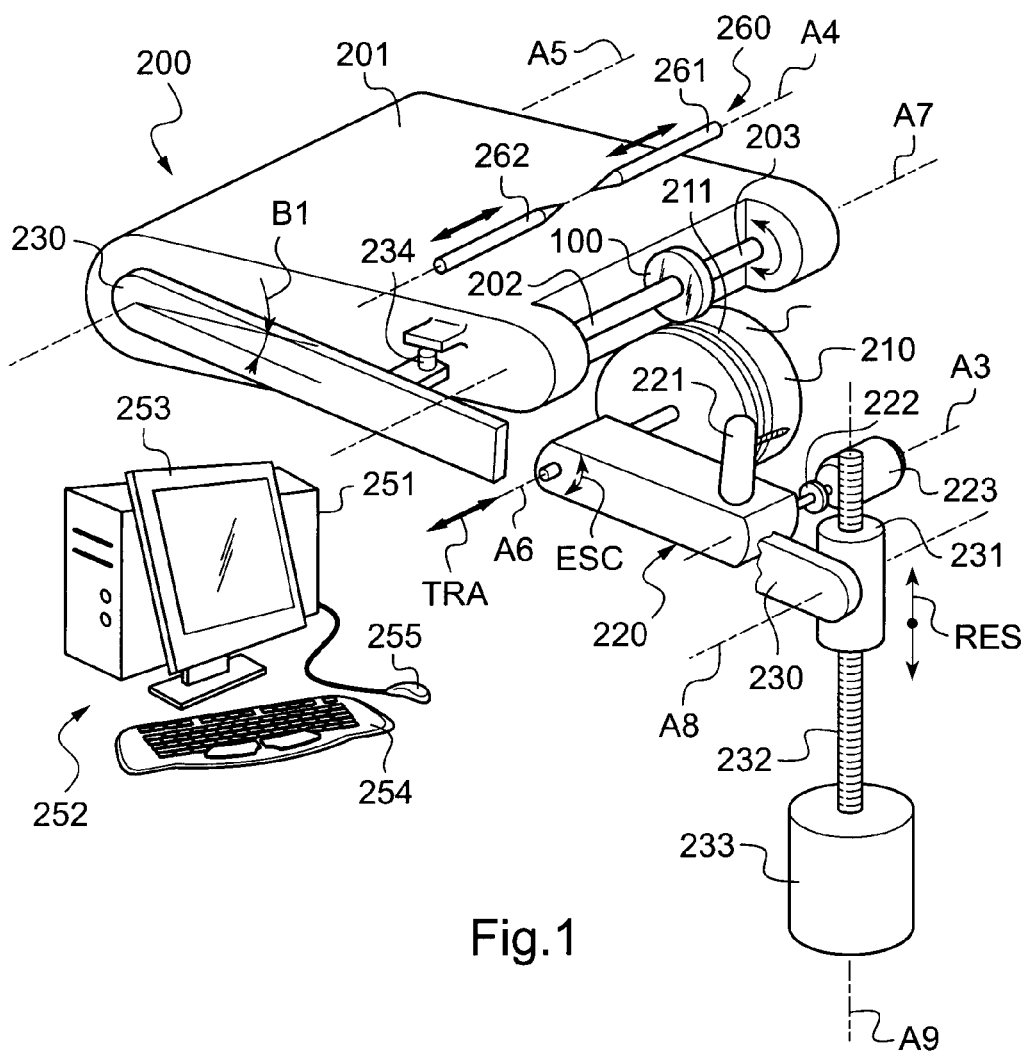
FIG. 1 is a diagrammatic perspective view of a machining device in accordance with the invention.

In the example shown diagrammatically in FIG. 1, the machining device is constituted in known manner by an automatic grinder 200 commonly said to be "numerically-controlled". This specific grinder 200 comprises:

a rocker 201 that is mounted on a structure (not shown) to pivot freely about a reference axis A5, in particular a horizontal axis, and that serves to support the ophthalmic lens 100 that is to be machined;

a set of grindwheels 210, 211 constrained to rotate on a grindwheel axis A6 parallel to the reference axis A5 and that is also appropriately driven in rotation by a motor (not shown);

a finishing module 220 that is mounted to rotate about the grindwheel axis A6 and that carries tools for finishing the ophthalmic lens 100, specifically in this example a grooving grindwheel 222, a chamfering grindwheel 223, and drill means 221 for drilling the ophthalmic lens 100; and a feeler assembly 260 for feeling the ophthalmic lens 100, specifically comprising two feeler rods 261 and 262 in alignment with each other on a feeler axis A4 and mounted to move in translation along the feeler axis A4 in order to feel the front and rear faces of the ophthalmic lens 100.

The rocker 201 is fitted with a lens blocking support, formed in this example by two clamping shafts 202 and 203 that also serve to rotate the ophthalmic lens 100 for machining.

These two shafts 202 and 203 are in alignment with each other on a blocking axis A7 parallel to the axis A5. Each shaft 202, 203 possesses a free end that faces the free end of the other shaft. The free end of one of the shafts 202 is fitted with a blocking chuck for blocking the ophthalmic lens 100, while the free end of the other shaft 203 possesses a cavity for receiving a block previously fastened to the ophthalmic lens 100.

The first of the two shafts 202 is stationary in translation along the blocking axis A7. In contrast, The second of the two shafts 203 is movable in translation along the blocking axis A7 in order to clamp the ophthalmic lens 100 in axial compression between the two blocking chucks.

As shown diagrammatically in FIG. 1, the set of grindwheels 210, 211 comprises a plurality of grindwheels mounted coaxially about the grindwheel axis A6, each grindwheel being used for a specific machining operation on the ophthalmic lens 100 for machining.

This set of grindwheels comprises in particular a roughing grindwheel 210 that is in the form of a cylinder of revolution about the grindwheel axis A6, presenting a diameter of 155 millimeters, and a beveling grindwheel 211 that is substantially identical, but that presents, halfway along its length, a beveling groove of triangular cross-section.

The roughing grindwheel 210 is thus a roughing tool for roughing out the ophthalmic lens. The beveling grindwheel 211 is a finishing tool for machining the edge face of the ophthalmic lens 100 in such a manner as to present a bevel-shaped transverse profile adapted to engage in a groove of the surround of the eyeglass frame.

The set of grindwheels could naturally include other grindwheels, such as polishing grindwheels.

The set of grindwheels 210 is carried by a carriage (not shown) that is mounted to be movable in translation along the grindwheel axis A6. The movement in translation of the grindwheel-carrier carriage is referred to as "transfer" TRA.

It can be understood that in this example the idea is to move the grindwheels relative to the lens, but that in a variant provision could be made for the lens to move axially, with the grindwheels remaining in a stationary position.

The grinder 200 also includes a link 230 having one end hinged relative to the structure to pivot about the reference axis A5 and having its other end hinged relative to a nut 231 in order to pivot about an axis A8 parallel to the reference axis A5.

The nut 231 is itself mounted to move in translation along a reproduction axis A9 perpendicular to the reference axis A5. As shown diagrammatically in FIG. 1, the nut 231 is a tapped nut in screw engagement with a threaded rod 232 that is aligned along the reproduction axis A9 and that is driven in rotation by a motor 233.

The link 230 also has a contact sensor 234, e.g. constituted by a Hall effect cell, that interacts with a corresponding element of the rocker 201. The pivot angle of the link 230 about the reference axis A5 and relative to the horizontal is written B1. This angle B1 is linearly associated with the vertical movement in translation of the nut 231 along the reproduction axis A9, which movement is written RES.

The finishing module 220 is pivotally movable about the grindwheel axis A6, which movement is referred to as freedom to move in retraction and is written ESC. Specifically, the finishing module 220 is provided with a toothed wheel (not shown) that meshes with a grindwheel fitted to the drive shaft of an electric motor secured to the grindwheel carriage. This freedom of movement enables it to move its finishing tools 221, 222, 223 towards or away from the ophthalmic lens 100.

Among the finishing tools, the grooving grindwheel 222 and the chamfering grindwheel 223 are mounted on a rotary shaft of the finishing module 220, which shaft is of axis of rotation A3 parallel to the reference axis A5. A motor carried inside the finishing module 220 serves to drive these two finishing tools 222 and 223 in rotation in order to grind the ophthalmic lens 100.

The grooving grindwheel 222 shown in this example is in the form of a disk of axis coinciding with the axis of rotation A3. It is of small thickness, being about one millimeter thick, so as to enable grooves of small width to be made in the edge face of the ophthalmic lens 100.

The chamfering grindwheel 223 presents a central portion that is cylindrical and two end portions that are conical, of axes that coincide with the axis of rotation A3. Its two conical end portions serve to chamfer the front and rear edges of the edge face of the ophthalmic lens 100.

The drill 221 in this example comprises a support mounted stationary on the finishing module 220 and a drill bit mounted to rotate on the support about an axis parallel to the reference axis A5. This drill 221 thus serves to drill holes in the ophthalmic lens 100 clamped between the two shafts 202 and 203.

The two rods 261 and 262 for feeling the ophthalmic lens 100 are circularly cylindrical in shape about the feeler axis A4, with the exception of their facing ends that are pointed so as to feel each face of the ophthalmic lens 100 at a precise point. These two rods 261 and 262 are driven in translation along the feeler axis A4 by a motor (not shown) in order to move away from the corresponding faces of the lens or to be urged into contact with those faces in order to determine the three-dimensional coordinates of the points being felt.

Finally, the grinder 200 includes a control unit 251 for controlling its various freedoms of movement, which control unit is of the electronic and/or computer type and serves in particular to control:

the motor for driving the second shaft 203 in translation;
the motor for driving the two shafts 202 and 203 in rotation;
the motor for driving the grindwheel carriage in translation along the transfer direction TRA;
the motor 233 for driving the nut 231 in translation along the reproduction direction RES;

the motor for driving the finishing module 220 in rotation in the retraction direction ESC;

the motor for driving the grooving and chamfering grindwheels 222 and 223 in rotation;

the motor for driving the bit of the drill 221 in rotation; and the motor for driving the two feeler rods 261 and 262 in translation.

As shown in FIG. 1, the control unit is implemented as a desktop computer connected to the grinder 200. Naturally, in a variant, the software portion of the grinder could be implemented directly in an electronic circuit of the grinder. It could also be implemented in a remote computer, in communication with the grinder over a private or public network, e.g. using an Internet protocol (IP) for communication.

Finally, the grinder 200 includes a man-machine interface (MMI) 252 that comprises, in this example, a display screen 253, a keyboard 254, and a mouse 255 adapted for communication with the control unit 251. This MMI 252 enables the user to input numerical values via the display screen 253 for controlling the grinder 200 accordingly.

Naturally, in order to perform the cutting and finishing operations for properly shaping the ophthalmic lens 100, it is appropriate for the various axes in question to be accurately identified relative to one another.

More precisely, the reference axis A5 and the grindwheel axis A6 are axes that are stationary relative to the structure of the grinder 200, so it is appropriate for the angular position of the reference axis A5 relative to the grindwheel axis A6, as defined by the angle B1, to be properly identified in the overall rotary frame of reference.

Likewise, it is appropriate for the angular position of the shafts 202 and 203 about the blocking axis A7 to be properly identified.

It is also appropriate for the axial position of the set of grindwheels 210, 211 along the grindwheel axis A6 to be properly identified.

The same applies to the diameters of the grindwheels 210 and 211 of the set of grindwheels, with this applying both to their outside diameters and to the diameter at the bottom of the beveling groove.

For the drill 221, it is appropriate to identify the position of the end of its bit in order to drill the lens at an accurate point and to an accurate depth.

It is also appropriate to identify the positions of the edge face of the grooving grindwheel 222 (of diameter that is reduced on each machining operation), and of the conical ends of the chamfering grindwheel 223 (of shape that changes on each machining operation).

Calibration Template

For these various identifications, it is necessary to calibrate the grinder 200 when it is initially put into operation, and it is necessary to renew this calibration periodically, in particular each time the grindwheels 210 and 211 and the finishing tools 221, 222, 223 are changed or burnished.

The calibration template 1 shown in FIGS. 2 to 9 is intended specifically to facilitate such calibration.

Figure 2:
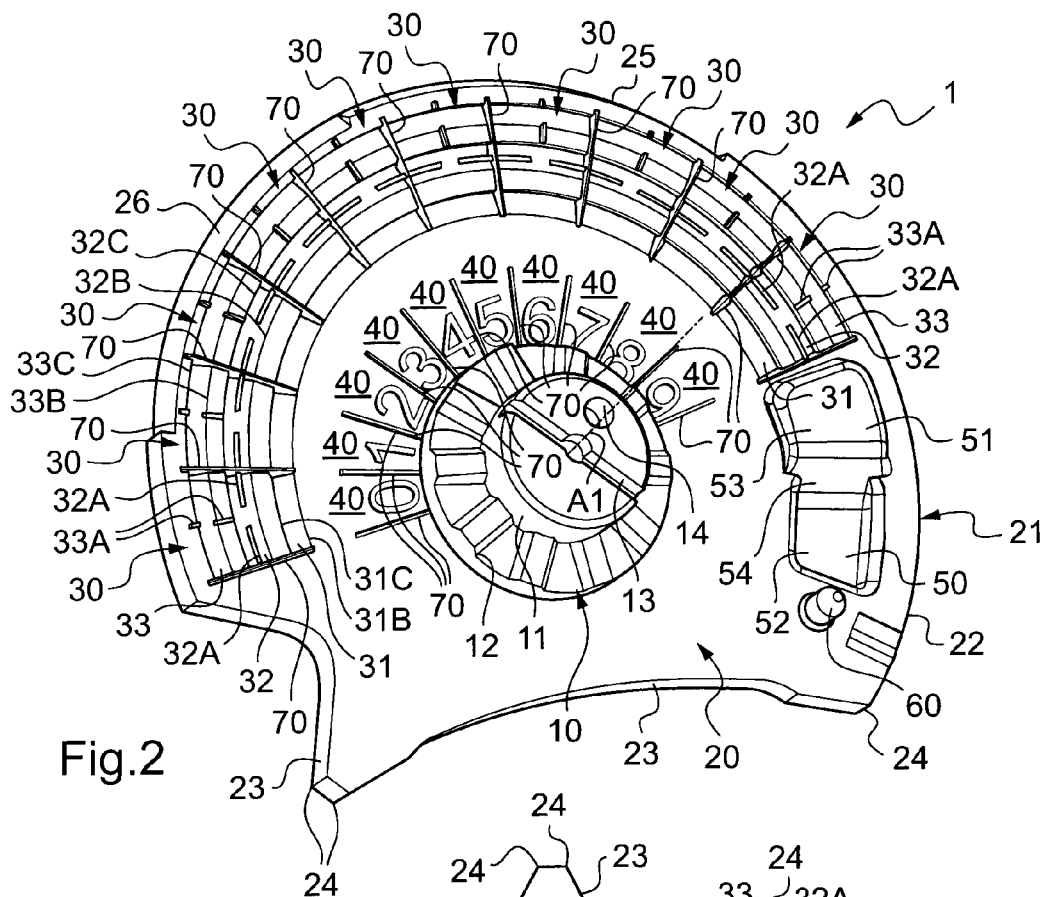
FIG. 2 is a diagrammatic perspective view of a calibration template in accordance with the invention.

As shown in FIG. 2, the calibration template 1, which is designed to be mounted on the grinder 200 for calibration instead of and in the place of the ophthalmic lens 100, is in the general shape of a disk 20 (the "calibration portion") about a main axis A1, with a stud (the "fastening portion") projecting from its central zone and suitable for enabling it to be mounted in the reception cavity in the second shaft 203 of the grinder 200.

Specifically, the stud 10 comprises a sleeve 11 that is circularly cylindrical about the main axis A1, and a crenellated collar 12 surrounding the sleeve 11. Because of its sleeve 11 and its crenellated collar 12, the calibration template 1 is suitable for being blocked on the second shaft 203 of the grinder, and then for being rigidly fastened between the two shafts 202 and 203 of the grinder 200.

The circular end of the sleeve 11 presents a groove 13 that extends along one of its diameters, and a hole 14.

By means of the groove 13 and hole 14, the angular and axial positions of the calibration template 1 on the shafts 202, 203 of the grinder 200 can be correctly identified.

The edge face 21 of the calibration template 1 is circular over a portion of its perimeter, and it includes two setbacks 23 hollowed out relative to said circle. Each setback 23 presents two angular points 24 at its two ends.

A first of these setbacks 23, the smaller of the two, presents a hollow dihedral shape. Its two angular points 24 are not very far apart, thus enabling them to be put into contact against a grindwheel of small diameter, such as the chamfering grindwheel 223.

The second setback 23 presents a hollow circular shape. Its two angular points 24 are spaced apart from each other by a greater distance, thus enabling them to be put into contact against a grindwheel of large diameter, such as the beveling grindwheel 211. In the embodiment shown, the two angular points 24 of this second setback 23 are spaced apart from each other by 90 degrees about the main axis A1.

The remaining portion 22 of the edge face 21 of the calibration template 1 is circular.

On two adjacent fractions 25 and 26 of this circular portion 22, the edge face 21 of the calibration template 1 presents a profile of beveled shape. Each fraction 25, 26 extends around the main axis A1 over an angle that is substantially equal to 60 degrees. The bevels formed on these two fractions 25 and 26 present different peak angles, one of them being equal to 90 degrees and the other equal to 120 degrees.

The remainder of the circular portion 22 of the edge face 21 of the calibration template 1 is smooth and circularly cylindrical about the main axis A1.

The calibration template 1 also includes two hollow projections 50 and 51 extending generally over a circular arc about the main axis A1, and each projecting from a respective one of its two faces.

The bottoms 52, 53 of these hollow projections 50, 51 are flat and extend parallel to the faces of the calibration template 1. They are connected together continuously by a connection wall 54 that is also substantially plane and that extends generally slantwise relative to the calibration template 1, making an angle of about 45 degrees relative thereto.

The calibration template 1 also presents two pegs 60 projecting from its two faces, the pegs being in line with each other and substantially perpendicular to said faces.

On its front face, the calibration template 1 also presents firstly a plurality of shape patterns 30, and secondly a plurality of visual identifiers 40, each visually associated with a respective one of the shape patterns 30.

The shape patterns 30 are geometrical figures where the calibration template 1 is to be machined so as to make it possible to calibrate the finishing tools of the grinder 200, as described in greater detail below.

The visual identifiers 40 are symbols that enable the user to identify each shape pattern 30 and that can be input by the user via the MMI 252 in order to select a preferred shape pattern 30.

As shown in FIG. 2, the shape patterns 30 and the visual identifiers 40 are associated by placing each shape pattern 30 and the associated visual identifier 40 in a common and exclusive zone of the front face of the calibration template 1.

For this purpose, half of the front face of the calibration template 1, i.e. the half opposite from the setbacks 23, is subdivided in this example into two equivalent and adjacent angular sectors that are separated in pairs by partially-interrupted separator lines 70.

Ten shape patterns 30 and ten visual identifiers 40 are thus provided situated respectively in these two angular sectors.

In this example, each visual identifier 40 is formed by a digit written 0 to 9. These digits are distributed along the edge of the stud 10 and they are clearly separated in pairs by the separator lines 70.

In a variant, provision could be made for the visual identifiers to be formed in some other way, e.g. by distinct letters (A to J) or by distinct geometrical figures (square, round, star, lozenge, . . . ).

The shape patterns 30 are of shapes and sizes that are all identical, and they are distributed at regular intervals around the main axis A1.

In this example, each shape pattern 30 is made up of three distinct centering marks 31, 32, and 33. As described in greater detail below, these centering marks 31, 32, and 33 are defined zones that are to be machined once only in order to calibrate a single freedom of movement of each of the finishing tools of the grinder 200.

The three centering marks 31, 32, and 33 of each shape pattern 30 are defined in this example firstly by the two separator lines 70 of the corresponding angular sector, and secondly by separating circular arcs 31B, 31C, 32B, 32C, 33B, and 33C that are centered on the main axis A1 and that extend from one separator line 70 to the other.

A first centering mark 31, situated on the inside of the calibration template 1 is left empty of lines or geometrical figures.

A second centering mark 33, situated on the outside of the calibration template 1 includes a first target 33A. Specifically, this first target 33A is in the form of a line on an axis that is radial relative to the main axis A1 and that extends at equal distances from the two separator lines 70 of the corresponding angular sector, the target line being interrupted in its center.

A third centering mark 32, situated between the two above-mentioned centering marks 31, 33, has a second target 32A. In this example, the second target 32A is in the form of a circular arc centered on the main axis A1 and that extends from one of the two separator lines 70 of the corresponding angular sector to the other at equal distances from the two corresponding separator circular arcs 32B, 32C, and it is interrupted at its center.

Advantageously, the calibration template 1 is made as a single-piece molding of a material that, under normal conditions of temperature and pressure, is suitable for being machined by the finishing tools 221, 222, and 223 of the grinder 200.

More particularly, the material is selected to present under such normal conditions of temperature and pressure a Young's modulus that lies in the range 1900 megapascals (MPa) to 2500 MPa.

Typically, this calibration template 1 is preferably made of a material that is known and used for fabricating ophthalmic lenses. More specifically, in this example it is made of polycarbonate.

In this example, the visual identifiers 40 and the shape patterns 30 are made in relief on its front face, during fabrication by molding, with this being advantageous because of low cost price.

Naturally, in a variant, the visual identifiers 40 and the shape patterns 30 could be formed in some other way. By way of example, they could be printed on the calibration template. They could also be in the form of a sticker for sticking on the calibration template.

Calibration Method

In order to use the calibration template 1 on the grinder 200, it is necessary to perform a certain number of operations, and these operations are preferably performed in the following order.

The calibration template 1 is initially put into place between the two shafts 202 and 203 of the grinder 200, while ensuring that its groove 13 and its hole 14 engage with the rib and the peg provided correspondingly on the second shaft 203 of the grinder 200, thus enabling the angular and axial positions of the calibration template 1 to be accurately identified relative to the blocking axis A7.

Thereafter, the control unit 251 causes the rocker 201 to move downwards under the control of its nut 231 until the calibration template 1 comes to bear against the roughing grindwheel 210 via one of its angular points 24. The corresponding contact is then detected by the contact sensor 234 as soon as the link 230 moves away from the rocker 201 as it continues to move under drive from the nut 231.

The angular position of the calibration template 1 about the blocking axis A7 is then incremented by causing the shafts 202, 203 to pivot until its other angular point 24 comes to bear against the roughing grindwheel 210. Once more, the contact sensor 234 detects the corresponding contact.

The value of the angle B1 is then stored in memory as a reference for drawing up setpoint tables for lowering the rocker 201 during the machining of ophthalmic lenses 100.

Thereafter, the calibration template 1 is applied against the beveling grindwheel 211 via its bevel 25. The beveling grindwheel 211 is then moved axially along the grindwheel axis A6, thus making it possible to identify the axial position of its beveling groove relative to the shafts 202, 203.

The value of this angular position is then likewise stored in memory as a reference for establishing setpoint tables.

Thereafter, the calibration template 1 is pressed against the beveling grindwheel 211 via its bevel 26 so that its bevel comes into contact with the bottom of the beveling groove in order to identify the diameter of the beveling grindwheel 211 at the bottom of its groove.

This value is likewise stored in memory as a reference for drawing up setpoint tables.

The various identified values thus make it possible to calibrate the positions of the roughing grindwheel 210 and of the beveling grindwheel 211 effectively relative to the shafts 202, 203.

The positions of the feeler rods 261, 262 relative to the shafts 202, 203 are then calibrated.

For this purpose, the rods 261, 262 are taken to their back stops and then moved into abutment against each other so that the origins of their respective local frames of reference are well defined.

They are then moved so as to bear against the ends of the pegs 60 in order to monitor their positions relative to the shafts 202, 203 of the grinder 200.

In order to monitor their linearity, they are then moved so as to bear against opposite sides of the bottom 52 of one of the hollow projections 50 and they are then slid towards the bottom 53 of the other hollow projection 51, passing over the connecting wall 54.

Their respective movements are appropriately identified, thereby making it possible to determine the linearity parameters of each of the two rods 261, 262.

Figure 3:
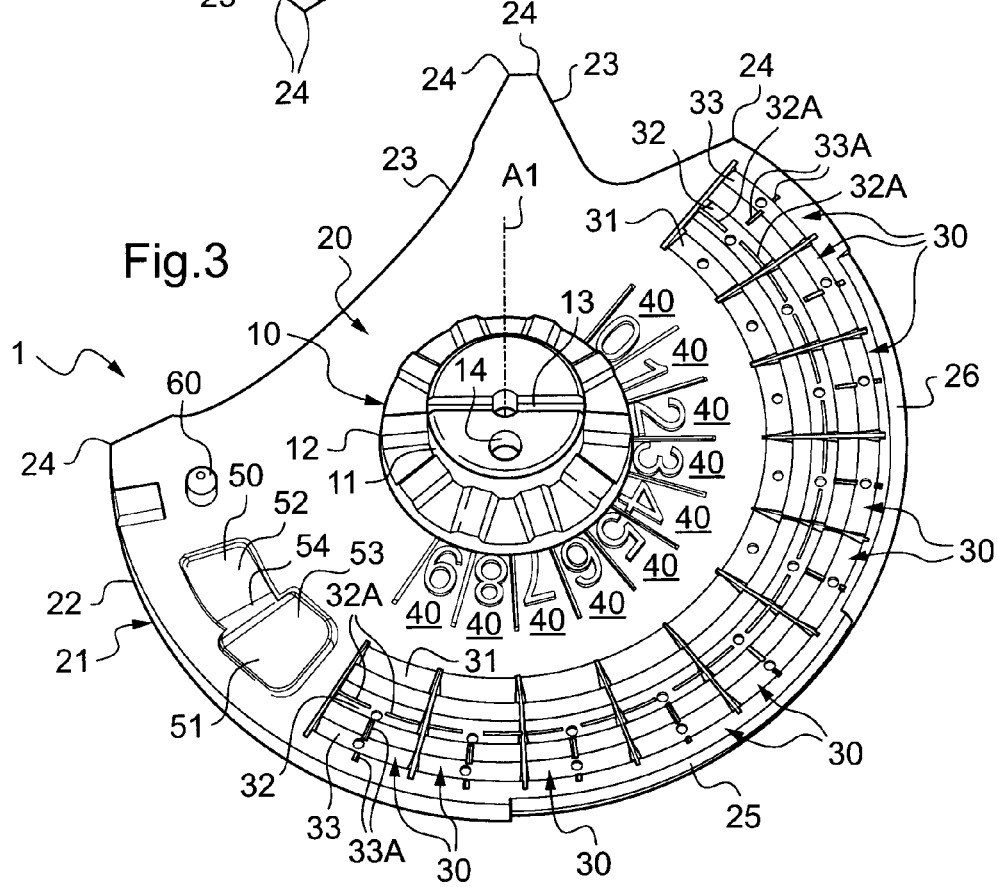
FIG. 3 is a diagrammatic perspective view of the FIG. 2 calibration template after it has been used for calibrating the drill of the FIG. 1 machining device.

The position of the drill 221 is then calibrated relative to the shafts 202, 203 (see FIG. 3).

The drill 221 is then considered as possessing three freedoms of movement ρ, θ, z relative to the shafts 202, 203.

The first freedom of movement ρ is specifically constituted by the ability of the finishing module 220 to pivot about the grindwheel axis A6 in order to move the bit of the drill 221 radially towards the calibration template 1.

The second freedom of movement θ is constituted by the ability of the shafts 202, 203 to pivot relative to the grindwheel axis A6, thereby making it possible, in combination with the first freedom of movement, to place the bit of the drill 221 in the desired position facing the calibration template 1.

Finally, the third freedom of movement z is constituted by the ability of the set of grindwheels and of the finishing module 220 to move in translation along the grindwheel axis A6, in order to move the bit of the drill 221 axially towards the calibration template 1 in order to drill it.

While drilling an ophthalmic lens 100 or the calibration template 1, the control unit 251 thus generates three control setpoints $\rho_c$, $\theta_c$, $z_c$ for controlling the three freedoms of movement, ρ, θ, z of the drill 221 in combination.

Each of these three control setpoints $\rho_c$, $\theta_c$, $z_c$ is corrected on each drilling operation by a calibration parameter $\rho_c$, $\theta_0$, $z_0$.

Such calibration parameters serve to compensate for so-called "drift" errors, i.e. for errors that stem from the progressive wear of the finishing tools, and also so-called "fabrication" errors, i.e. the errors that stem from the fact that the grinder is never absolutely identical to its theoretical design.

In this example, each calibration parameter $\rho_c$, $\theta_0$, $z_0$ is formed by a constant to which the corresponding control setpoint is added.

Calibrating the position of the drill 221 then comprises determining the calibration parameters $\rho_c$, $\theta_0$, $z_0$ of the three control setpoints $\rho_c$, $\theta_c$, $z_c$.

In this example, these three calibration parameters $\rho_c$, $\theta_0$, $z_0$ are determined in succession, using three successive steps of machining shape patterns 30 of the calibration template 1.

More precisely, during a first step, the control unit 251 proceeds to determine the calibration parameter $z_0$ for the control setpoint $z_c$ concerning the third freedom of movement z of the drill 221.

The unit begins by setting this calibration parameter $z_0$ to a predetermined first value that is stored in its read-only memory (ROM).

Thereafter, the control unit 251 causes both the finishing module 220 to perform a retraction movement ESC and the two shafts 202, 203 to pivot about the blocking axis A7 in order to place the free end of the drill bit of the drill 221 substantially facing the center of the first centering mark 31 of one of the angular sectors of the calibration template 1, specifically the sector that is identified by the value 0.

The control unit 251 then causes the drill bit of the drill 221 to rotate and then causes the finishing module 220 to move in translation TRA so as to cause the drill bit of the drill 221 to approach the calibration template 1, up to a predetermined position in which the drill bit is supposed to drill the calibration template 1 to a depth of the order of one-tenth of a millimeter.

The operation is then repeated in order to drill the first centering mark 31 of each of the other angular sectors of the calibration template 1.

The control unit 251 thus causes the following operations to be performed in succession:

the finishing module 220 to move in translation TRA in order to move the drill bit away from the calibration template 1;

the two shafts 202, 203 to pivot about the blocking axis A7 in order to place the free end of the drill bit substantially facing the center of the first centering mark 31 of the following angular sector; and the finishing module 220 to move in translation TRA so as to move the drill bit towards the calibration template 1 up to a predetermined position in which the drill bit is supposed to have drilled the calibration template 1 to a depth of the order of one-tenth of a millimeter.

Nevertheless, before each drilling operation, the control unit 251 modifies the calibration parameter $z_0$ by incrementing it by a predetermined constant. In this example, the constant is greater than the depth to which the calibration template 1 is supposed to be drilled.

The drilling operation is thus performed in similar but not strictly identical manner on each shape pattern 30.

At the end of these drilling operations, the user inspects the calibration template 1 visually and then identifies which visual identifier 40 is associated with the centering mark 31 being drilled to a depth of about one-tenth of a millimeter. For this purpose, the user determines the number of the visual identifier 40 of the first angular sector on which a first drilling trace appears. As shown in FIG. 3, this is the number 4.

The control unit 251 then causes the display screen 253 to display a menu enabling the value of any one of the visual identifiers 40 to be input. The user can thus use the keyboard 254 to input the number of the visual identifier of the selected angular sector.

Finally, the control unit 251 gives the calibration parameter $z_0$ the value of the calibration parameter that was in use while drilling the first centering mark 31 of the selected angular sector.

In this way, the control unit 251 ensures that the actual axial position of the free end of the drill bit during subsequent machining operations corresponds exactly to the desired position.

During a second step, the control unit 251 proceeds to determine the calibration parameter $\rho_c$, for the control setpoint $\rho_c$ of the first freedom of movement ρ of the drill 221.

For this purpose, it proceeds in a manner similar to that used for the first step, beginning by setting this calibration parameter $\rho_0$ to a predetermined value, and then controlling the drilling of the second centering mark 32 in each angular sector of the calibration template 1.

Nevertheless, in this step, the control unit 251 modifies the value of the calibration parameter $\rho_0$ on its own before each drilling operation by incrementing it by a predetermined constant.

At the end of these drilling operations, the user inspects the calibration template 1 visually and then determines the number of the visual identifier 40 that is associated with the centering mark 32 where the drill has drilled the calibration template 1 in the center of the target 32A. As shown in FIG. 3, this is the number 4.

The user then uses the keyboard 254 to input the number of the visual identifier 40 of the selected angular sector, and the control unit gives the calibration parameter $\rho_0$ the value of the parameter that was in use while drilling the second centering mark 32 in the selected angular sector.

During a third step, the control unit 251 proceeds to determine the calibration parameter $\theta_0$ of the control parameter $\theta_c$ for the second freedom of movement θ of the drill 221.

To do this, it proceeds in a manner similar to the manners used during the first and second steps, beginning by setting the calibration parameter $\theta_0$ to a predetermined value, and then by causing the third centering mark 33 to be drilled in each angular sector of the calibration template 1.

Nevertheless, in this step, the control unit 251 modifies the value of the calibration parameter $\theta_0$ on its own before each drilling operation by incrementing it by a predetermined constant value.

At the end of these drilling operations, the user inspects the calibration template 1 visually and determines the number of the visual identifier 40 that is associated with the centering mark 33 in which the drill has drilled the calibration template 1 in the center of the target 33A. As shown in FIG. 3, this is the number 4.

The user then uses the keyboard 254 to input the number of the visual identifier 40 of the selected angular sector, and the control unit 251 gives the calibration parameter $\theta_0$ the value of the parameter that was in use while drilling the third centering mark 33 in the selected angular sector.

In this way, all of the freedoms of movement, $\rho$, $\theta$, and $\underline{z}$ of the drill 221 are accurately calibrated.

Figure 4:
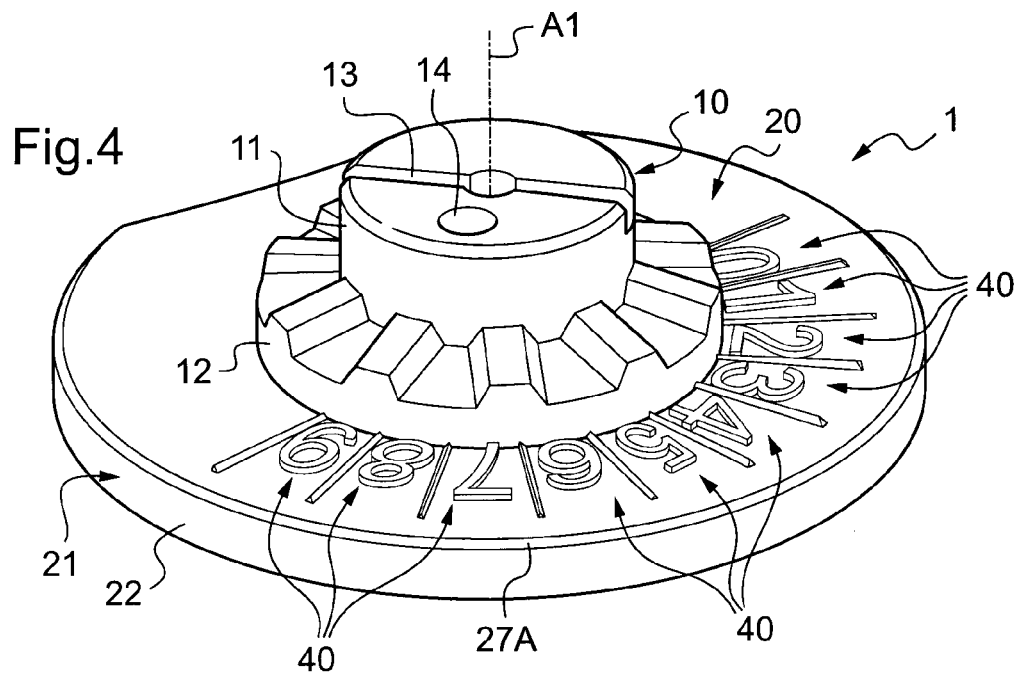
FIG. 4 is a diagrammatic perspective view of the FIG. 2 calibration template after it has been used for calibrating a first portion of the chamfering grindwheel of the FIG. 1 machining device.
Figure 5:
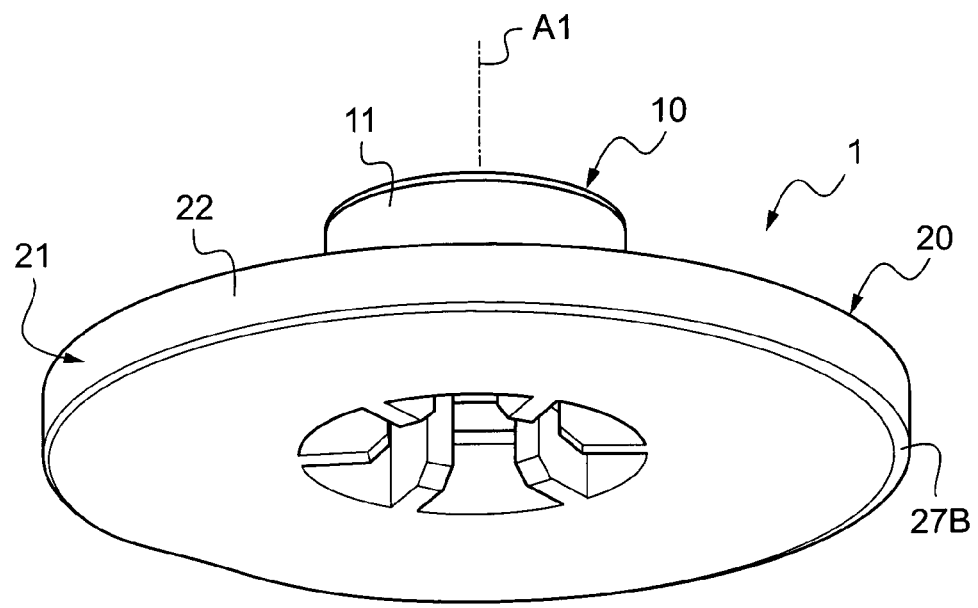
FIG. 5 is a diagrammatic perspective view of the FIG. 2 calibration template after it has been used for calibrating a second portion of the chamfering grindwheel of the FIG. 1 machining device.

The position of the chamfering grindwheel 223 relative to the shafts 202, 203 is then calibrated (see FIGS. 4 and 5).

This consists more particularly in determining the pass depth preferred by the user for chamfering each of the two edges of an ophthalmic lens.

The chamfering grindwheel 223 is then considered as possessing three freedoms of movement $\rho'$, $\theta'$, z' relative to the shafts 202, 203, which freedoms of movement correspond to the freedoms of movement $\rho$, $\theta$, $\underline{z}$ of the drill.

While chamfering a lens or the calibration template 1, the control unit 251 generates three control setpoints $\rho'_c$, $\theta'_c$, $z'_c$ for controlling a combination of the three freedoms of movement of the chamfering grindwheel 223.

In this calibration operation, only one of these control setpoints $\rho'_c$ is corrected by a calibration parameter $\rho'_0$. Modifying this single calibration parameter $\rho'_0$ suffices to modify the pass depth of the chamfering grindwheel 223.

Before seeking to determine the ideal value for this calibration parameter $\rho'_0$, the control unit 251 uses the roughing grindwheel 210 to rough out the entire outline of the calibration template 1 so as to reduce its diameter and cause the shape patterns 40 and the setbacks 23 to disappear. The calibration template 1 then presents an edge face that is substantially circularly cylindrical about the main axis A1.

Thereafter, the control unit 251 causes the finishing module 220 to move in translation along the grindwheel axis A6 so as to place a conical first end of the chamfering grindwheel 223 level with the front edge of the edge face 21 of the chamfering template 1. The control unit also causes the two shafts 202, 203 to pivot about the blocking axis A7 so as to place the first angular sector of the calibration template 1 facing the chamfering grindwheel 223.

The control unit 251 then sets the calibration parameter $\rho'_0$ to a first predetermined value that is stored in its ROM.

Thereafter it causes the finishing module 220 to move in translation ESC and in transfer TRA so as to begin to chamfer the front edge of the edge face 21 of the ophthalmic lens. It also causes the two shafts 202, 203 to pivot about the blocking axis A7 to continue such chamfering along this first edge. Nevertheless, each time the chamfering grindwheel 223 passes from one angular sector of the calibration template 1 to the next, the control unit 251 increments the value of the calibration parameter $\rho'_0$ by a predetermined constant.

The calibration template 1 thus presents a chamfer 27A of depth that varies along its outline.

At the end of this chamfering operation, the user inspects the calibration template 1 visually and then determines the angular sector in which the chamfer 27A presents the desired depth.

The user then uses the keyboard 254 to input the number of the visual identifier 40 of the selected angular sector, and the control unit 251 gives the calibration parameter $\rho'_0$ the value of the parameter that was in use while chamfering the selected angular sector.

The procedure is then the same, with the calibration template being roughed out once more in order to eliminate the first chamfer 27A and then to make a second chamfer 27B of varying size along the rear edge of the calibration template 1 while using the second conical end of the chamfering grindwheel 223.

This second chamfer thus serves to determine a new value for the calibration parameter $\rho'_0$ that is identical to or different from the first value to be found.

Thereafter, when subsequently machining ophthalmic lenses, the value used for the calibration parameter $\rho'_0$ may be different depending on whether chamfering is being performed on the front edge or on the rear edge of the lens.

Figure 6:
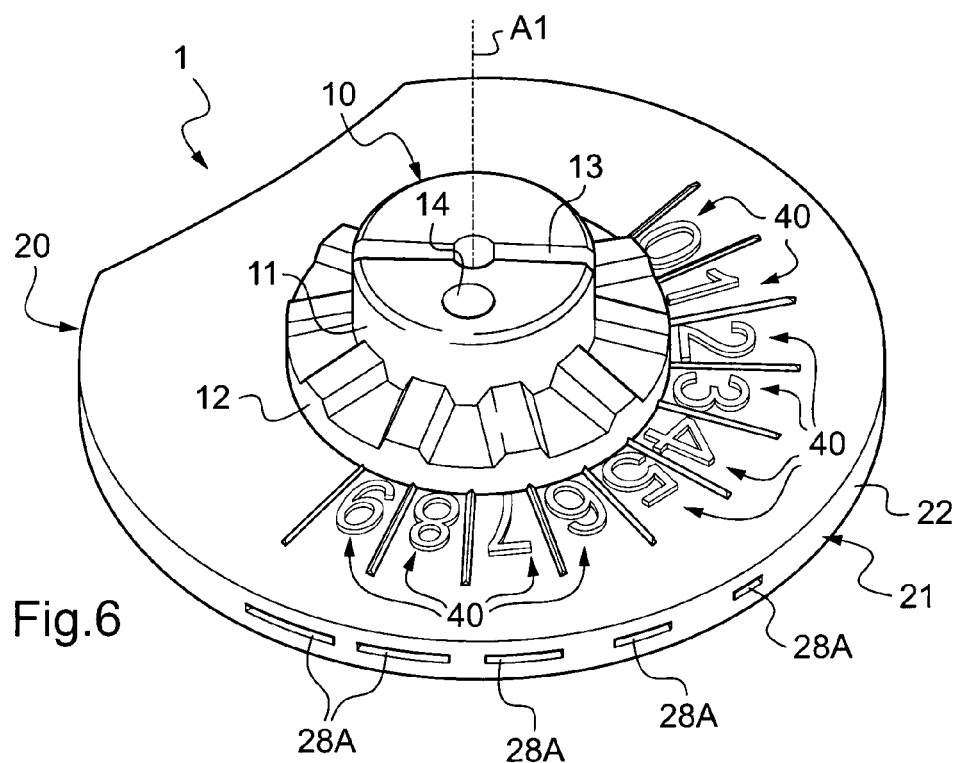
FIG. 6 is a diagrammatic perspective view of the FIG. 2 calibration template after it has been used for calibrating a first freedom of movement of the grooving grindwheel of the FIG. 1 machining device.
Figure 7:
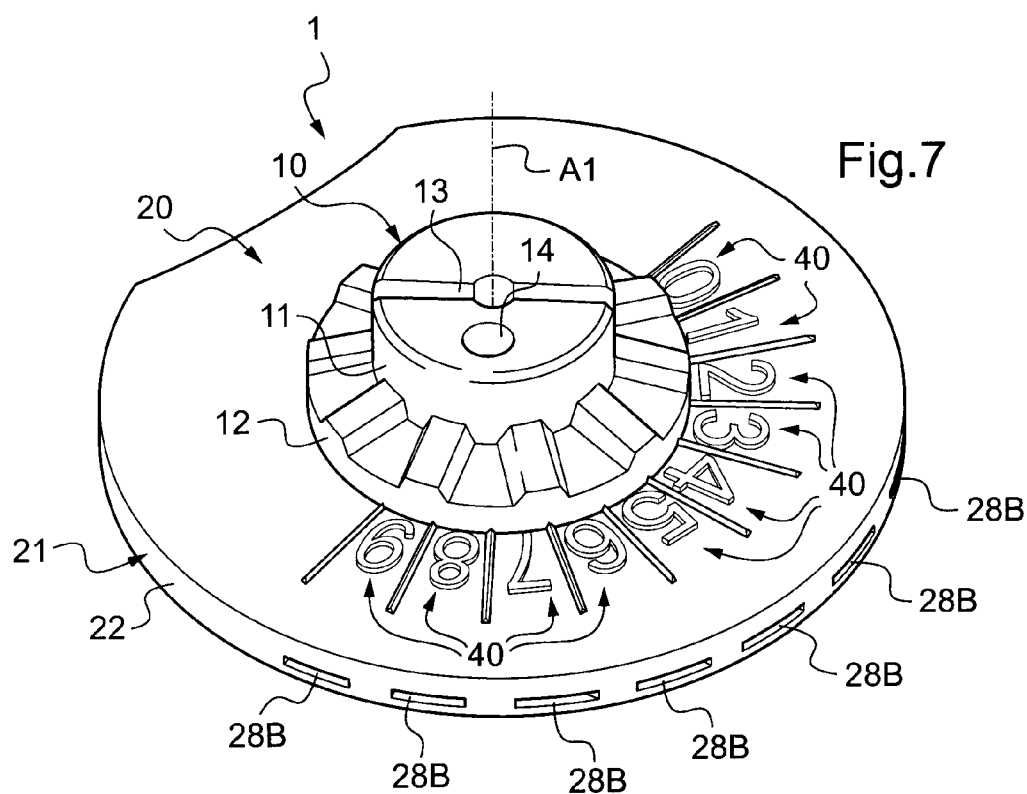
FIG. 7 is a diagrammatic perspective view of the FIG. 2 calibration template after it has been used for calibrating a second freedom of movement of the grooving grindwheel of the FIG. 1 machining device.

Finally, the position of the grooving grindwheel 222 relative to the shafts 202, 203 is calibrated (see FIGS. 6 and 7).

More precisely, this comprises firstly determining the pass depth preferred by the user for grooving the ophthalmic lens, and secondly monitoring the axial position (along the grindwheel axis A6) of the grooving grindwheel 222 relative to the shafts 202, 203.

The grooving grindwheel 222 is then considered as possessing three freedoms of movement $\rho''$, $\theta''$, z' that correspond to the freedoms of movement $\rho$, $\theta$, $\underline{z}$ of the drill 221.

While grooving a lens or the calibration template 1, the control unit 251 generates three control setpoints $\rho''_c$, $\theta''_c$, $z''_c$ for controlling the three freedoms of movement of the grooving grindwheel 222 in combination.

For this calibration, only two of these control setpoints $\rho''_c$ and $z''_c$ are corrected by calibration parameters written $\rho''_0$ and $z''_0$. Modifying only these two calibration parameters $\rho''u_0$, $z''_0$ suffices to modify the pass depth and to correct the axial position of the grooving grindwheel 222 relative to the shafts 202, 203.

For this purpose, during a first step, the control unit 251 causes the entire outline of the calibration template 1 to be roughed out so as to eliminate the second chamfer 27B formed on the rear edge of the calibration template 1, so that its edge face 21 is once more substantially a cylinder of revolution about the main axis A1.

Thereafter, the control unit causes the finishing module 220 to move in translation along the grindwheel axis A6 so as to place the grooving grindwheel 222 substantially halfway along the edge face 21 of the calibration template 1. It also causes the shafts 202, 203 to pivot so as to place the first angular sector of the calibration template 1 facing the grooving grindwheel 222.

Thereafter, the control unit 251 sets the calibration parameter $\rho''_0$ to a first predetermined value that is stored in its ROM.

Thereafter, the control unit 251 causes the grooving grindwheel 222 to rotate about its axis, and then causes the finishing module 220 to move in retraction ESC into a position in which the grooving grindwheel 222 is supposed to make a groove 28A of given depth in the edge face 21 of the calibration template 1.

The operation is then repeated for machining other grooves in each of the other angular sectors of the calibration template 1.

Nevertheless, before each grooving operation, the control unit 251 modifies the value of the calibration parameter $\rho''_0$ by incrementing it by a predetermined constant.

At the end of this grooving operation, the user visually inspects the calibration template 1 and then determines the number of the visual identifier 40 of the angular sector in which the groove 28A presents the user's preferred depth.

Thereafter, the user uses the keyboard 254 to input the number of the visual identifier 40 of the selected angular sector, and the control unit 251 gives the calibration parameter $\rho''_0$ the value of the parameter that was in use while grooving the selected angular sector.

During a second step, the control unit 251 proceeds to determine the calibration parameter $z''_0$.

To do this, it proceeds in a manner similar to that used for the first step, beginning by setting the calibration parameter $z''_0$ to a predetermined value, and once more roughing out the calibration template 1 so as to eliminate the grooves 28A, and then causing ten new grooves 28B to be machined in the edge face 21 of the calibration template 1 in each of its ten angular sectors.

Nevertheless, before each machining operation, the control unit 251 modifies the value of the calibration parameter $z''_0$ on its own, by incrementing it by a predetermined constant.

At the end of these grooving operations, the grooves 28B thus present different positions along the main axis A1 of the calibration template 1.

The user then visually inspects the calibration template 1 and determines the number of the visual identifier 40 situated where the position of the groove 28B is best centered across the edge face of the template.

The user then uses the keyboard 254 to input the number of this visual identifier 40 and the control unit gives the calibration parameter $z''_0$ the value of the parameter that was in use while grooving the selected angular sector.

Consequently, once these two steps have been performed, two of the three freedoms of movement $\rho''$ and $z''$ of the grooving grindwheel 222 are accurately calibrated.

Finally, the control unit 251 proceeds with a final operation of checking the selected machining parameters $\rho_0$, $\theta_0$, $z_0$, $\rho'_0$, $\rho''_0$, $z''_0$.

Figure 8:
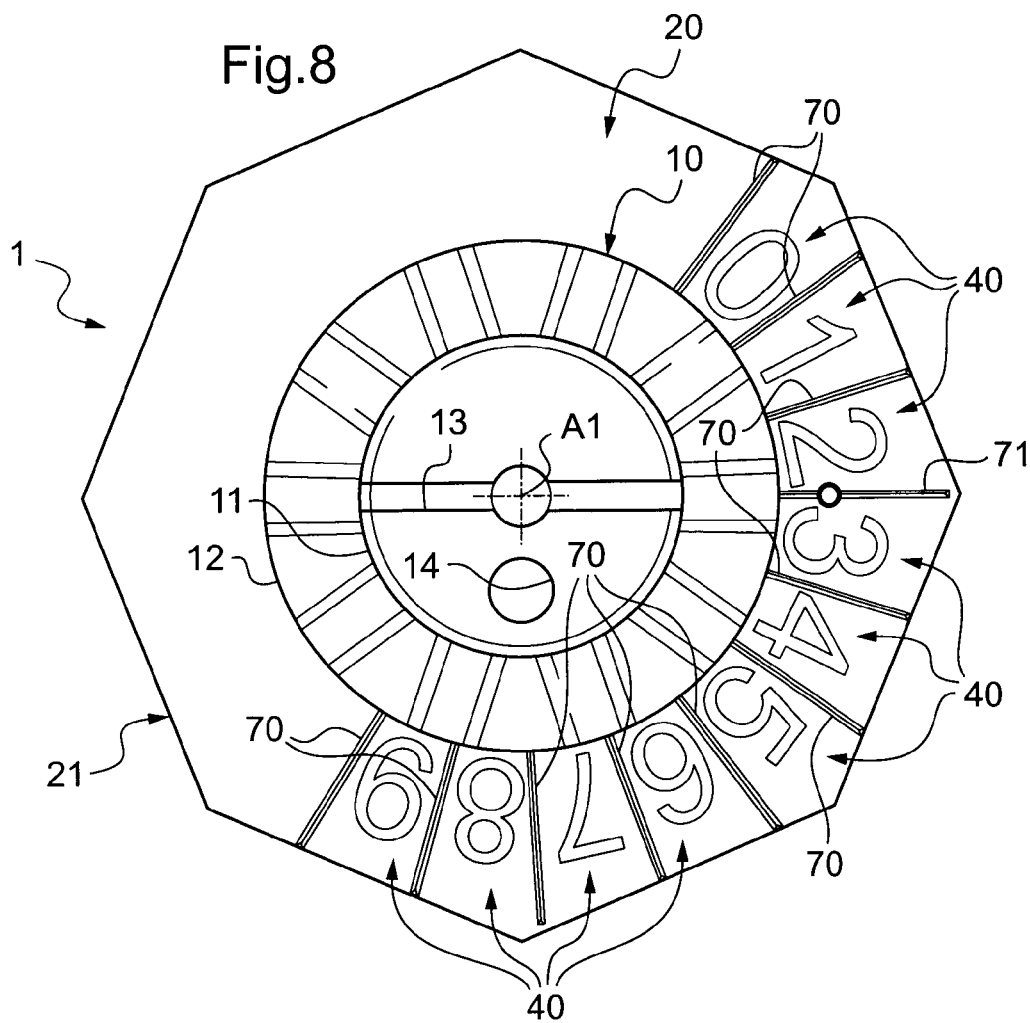
FIG. 8 is a diagrammatic perspective view of the FIG. 2 calibration template after it has been used for a final check of the calibration of the FIG. 1 machining device.

To do this, and as shown in FIG. 8, the final check consists in beveling the edge face 21 of the calibration template 1 along an octagonal outline having one of its vertices that is supposed to coincide with one of the separator lines 71 of the calibration template 1, with the calibration template 1 being drilled on that separator line 71. The user then visually inspects the calibration template 1 to check that the drilled separator line 71 does indeed coincide with one of the vertices of the octagon.

Thereafter, if so, the user validates the calibration by using the keyboard 254 to confirm the values selected for the machining parameters $\rho_0$, $\theta_0$, $z_0$, $\rho'_0$, $\rho''_0$, $z''_0$.

Otherwise, the user may either proceed to calibrate the grinder 200 once again using a new calibration template 1, or else the user can call on an experienced technician.

Figure 9:
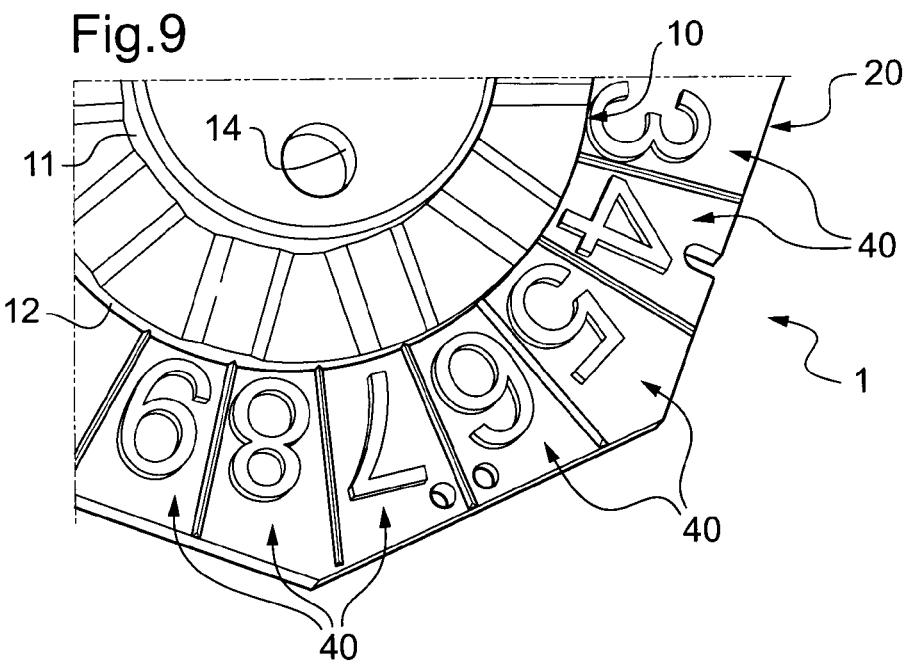
FIG. 9 is a diagrammatic perspective view of the FIG. 2 calibration template after the values of the calibration parameters of the FIG. 1 machining device have been marked therein.

Once the calibration has been validated by the user, the control unit 251 logs all of the values allocated to the various calibration parameters $\rho_0$, $\theta_0$, $z_0$, $\rho'_0$, $\rho''_0$, $z''_0$ by machining the calibration template 1 for a last time (see FIG. 9).

By means of this machining, the calibration template 1 can be used as a record of the calibration, since it carries marks of shapes and/or positions that indicate the values given to the various calibration parameters. The calibration template 1 can thus be conserved by the user so that in the event of a problem a technician can have easy access to the values of the calibration parameters.

Specifically, in order to record the values of the calibration parameters $\rho_0$, $\theta_0$, $z_0$ of the three control setpoints $\rho_c$, $\theta_c$, $z_c$ of the drill 221, the control unit 251 causes the following machining to be performed:
- a notch in the angular sector that was selected for calibrating the first freedom of movement $\rho$ of the drill 221;
- a through hole in the angular sector selected when calibrating the second freedom of movement $\theta$ of the drill 221; and
- a blind hole in the angular sector selected when calibrating the third freedom of movement $\underline{z}$ of the drill 221.

Preferably, other machining operations are then performed on the calibration template 1 in order to specify the values of the other calibration parameters $\rho'_0$, $\theta'_0$, $z'_0$.

The present invention is not limited in any way to the embodiments as shown, and the person skilled in the art knows how to make any variations thereto in accordance with its spirit.

In particular, it is possible to provide for the shape patterns (30) of the calibration template to be of shapes and/or sizes that are different. For example, provision may be made for the target of the second centering marks (32) to present circularly arcuate shapes of different diameters.

Provision may also be made for the shape patterns (30) and the visual identifiers (40) not to be distributed over angular sectors of the calibration template, but to be distributed in some other way, e.g. in a grid of three rows by three columns.

Finally, provision may be made for the drill support to be mounted to pivot on the finishing module of the grinder about an axis that is orthogonal to the reference axis and to the drill-bit axis. By being able to move in this way, the drill bit can drill a lens along a drilling axis that is orthogonal to the plane tangential to the front face of the lens at the point of drilling.

In this variant, calibration of the drill may be performed by blocking the drill support relative to the finishing module at a predetermined angle of orientation. Calibration may also be performed twice, by blocking the drill support relative to the finishing module using two different angles.

The invention claimed is:

1. A calibration template for calibrating a machining device that has blocking means for blocking an ophthalmic lens, and machining means for machining the ophthalmic lens, the template comprising a fastener portion suitable for being fastened to said blocking means and a calibration portion arranged around said fastener portion, wherein said calibration portion is made out of a material that is suitable for being machined by said machining means, and presents firstly a plurality of shape patterns, and secondly a plurality of visual identifiers, each visually associated with one of said shape patterns.

2. The calibration template according to claim 1, wherein said shape patterns are all of identical shape.

3. The calibration template according to claim 1, wherein said shape patterns are distributed at regular intervals over said calibration portion around said fastener portion.

4. The calibration template according to claim 1, wherein each shape pattern and each associated visual identifier extends around said fastener portion over a given angular sector of one face of said calibration portion.

5. The calibration template according to claim 1, wherein each shape pattern comprises a plurality of distinct centering marks.

6. The calibration template according to claim 5, wherein at least one of said centering marks includes a target.

7. The calibration template according to claim 6, wherein the target of one of said centering marks comprises a circular arc centered about said fastener portion, and the target of another of said centering marks comprises a mark that is radial relative to said fastener portion.

8. The calibration template according to claim 1, wherein said visual identifiers are constituted by distinct digits or letters.

9. The calibration template according to claim 1, made as a single piece by molding and in which said visual identifiers and said shape patterns are formed in relief on said calibration portion.

10. The calibration template according to claim 1, wherein said calibration portion presents an edge face having a circular fraction about the fastener portion and at least one local setback that is set back relative to said circular fraction in order to define two angular points.

11. The calibration template according to claim 1, wherein said calibration portion presents an edge face that includes a circular fraction about the fastener portion, which edge face presents a cross-section that is of bevel shape.

12. The calibration template according to claim 1, wherein said calibration portion presents front and rear faces that are substantially plane and that include two projections each projecting from a respective one of its front and rear faces, each of these two projections presenting a flat bottom that is substantially parallel to said front and rear faces, which flat bottoms are connected together by a connecting wall that is in part plane and slanting relative thereto.

13. The calibration template according to claim 1, wherein said calibration portion presents front and rear faces and includes a peg projecting from each of its front and rear faces.

14. A machining device comprising:
blocking means for blocking an ophthalmic lens;
machining means for machining said ophthalmic lens, the machining means comprising at least one of the following tools: a drill, a grooving grindwheel, and a chamfering tool;
a control unit for controlling the positions of said machining means relative to said blocking means;
information display means controlled by said control unit; and
input means accessible to the user to enable the user to input data and adapted to transmit said data to said control unit;
the device being characterized in that, in order to calibrate the position of said tool relative to said blocking means with the help of a calibration template as claimed in claim 1:
said control unit is programmed to display the visual identifiers that appear on said calibration template on said display means,
said input means enable one of the displayed identifiers to be selected; and
said control unit is adapted to calibrate the position of said tool relative to said blocking means as a function of the selected identifier.

15. A method of calibrating the position of a tool of a machining device according to claim 14 with the help of the calibration template, said tool presenting at least one freedom of movement controlled by the control unit of the machining device as a function of a control setpoint corrected by a calibration parameter, the method including the following steps:
a) fastening the fastener portion of the calibration template on the blocking means of the machining device;
b) machining the calibration portion of the calibration template by using the tool of the machining device on each of the shape patterns of the calibration template, in application of control setpoints that are similar but in which the calibration parameter is modified in each of the shape patterns;
c) a user visually selecting one of the machined shape patterns, namely the pattern where the machining that has been performed is considered as being the best;
d) the user reading the visual identifier associated with the selected shape pattern;
e) the user using the input means of the machining device to input the visual identifier that has been read; and
f) allocating the value that was used for machining the selected shape pattern as the calibration parameter.

16. The calibration method according to claim 15, wherein said tool presents at least one second freedom of movement controlled by the control unit of the machining device as a function of a control setpoint corrected by a second calibration parameter, and steps b) to f) are repeated by machining the calibration portion of the calibration template in each of its shape patterns using control setpoints that are similar but in which the second calibration parameter is modified in each of the shape patterns.

17. The calibration method according to claim 15, wherein said machining device includes another tool presenting at least one freedom of movement controlled by the control unit as a function of another control setpoint corrected by another calibration parameter, and steps b) to f) are repeated by machining the calibration portion of the calibration template in each of its shape patterns using control setpoints that are similar but in which said other calibration parameter is modified in each of the shape patterns.

18. The calibration method according to claim 15, including a step g) of logging the value allocated to the calibration parameter, in which step the calibration template is machined in a position or with a shape that is characteristic of said allocated value.

19. The calibration method according to claim 18, wherein, in step g), the position or the shape of the machining is characteristic of the calibrated calibration parameter.

20. The calibration method according to claim 15, including a step g') of finally checking the calibration template, in which step the edge face of the calibration template is machined with a predetermined shape, making it possible to check visually that the calibration parameter is appropriate.

21. The calibration method according to claim 20, wherein, in step g'), said predetermined shape forms at least one angle on the edge face of the calibration template that, providing the first calibration parameter is appropriate, is in alignment with a mark of the calibration template.

* * * * *

UNITED STATES PATENT AND TRADEMARK OFFICE
CERTIFICATE OF CORRECTION

PATENT NO. : 8,997,366 B2
APPLICATION NO. : 13/877344
DATED : April 7, 2015
INVENTOR(S) : Michel Nauche et al.

It is certified that error appears in the above-identified patent and that said Letters Patent is hereby corrected as shown below:

In the Specification

Please amend Column 7, lines 57 to 64, to read as follows:

-- As shown in Figure 2, the calibration template 1, which is designed to be mounted on the grinder 200 for calibration instead of and in the place of the ophthalmic lens 100, is in the general shape of a disk 20 (the "calibration portion") about a main axis A1, with a stud 10 (the "fastening portion") projecting from its central zone and suitable for enabling it to be mounted in the reception cavity in the second shaft 203 of the grinder 200. --

Please amend Column 11, lines 22 to 24, to read as follows:

-- Each of these three control setpoints $\rho_c$, $\theta_c$, $z_c$ is corrected on each drilling operation by a calibration parameter $\rho_0$, $\theta_0$, $z_0$. --

Please amend Column 11, lines 30 to 32, to read as follows:

-- In this example, each calibration parameter $\rho_0$, $\theta_0$, $z_0$ is formed by a constant to which the corresponding control setpoint is added. --

Please amend Column 11, lines 33 to 35, to read as follows:

-- Calibrating the position of the drill 221 then comprises determining the calibration parameters $\rho_0$, $\theta_0$, $z_0$ of the three control setpoints $\rho_c$, $\theta_c$, $z_c$. --

Signed and Sealed this
Twentieth Day of October, 2015

Michelle K. Lee
*Director of the United States Patent and Trademark Office*

CERTIFICATE OF CORRECTION (continued)
U.S. Pat. No. 8,997,366 B2

Please amend Column 11, lines 36 to 38, to read as follows:

-- In this example, these three calibration parameters $\rho_0$, $\theta_0$, $z_0$ are determined in succession, using three successive steps of machining shape patterns 30 of the calibration template 1. --

Please amend Column 12, lines 37 to 39, to read as follows:

-- During a second step, the control unit 251 proceeds to determine the calibration parameter $\rho_0$ for the control setpoint $\rho_c$ of the first freedom of movement $\rho$ of the drill 221. --

Please amend Column 14, lines 37, to read as follows:

-- For this calibration, only two of these control setpoints $\rho''_c$ and $z''_c$ are corrected by calibration parameters written $\rho''_0$ and $z''_0$. Modifying only these two calibration parameters $\rho''_0$, $z''_0$ suffices to modify the pass depth and to correct the axial position of the grooving grindwheel 222 relative to the shafts 202, 203. --